SWITCH INCLUDING SEALING AND SHIELDING MEANS THEREFOR

Filed March 11, 1966

INVENTOR
WILLIAM E. MANSFIELD
BY
Smythe & Moore
ATTORNEYS

United States Patent Office 3,317,698
Patented May 2, 1967

3,317,698

SWITCH INCLUDING SEALING AND SHIELDING MEANS THEREFOR

William E. Mansfield, Mattapoisett, Mass., assignor to Nichols Engineering, Incorporated, Shelton, Conn., a corporation of Connecticut Filed Mar. 11, 1966, Ser. No. 533,597
7 Claims. (Cl. 200—168)

This invention relates to environmental seals and electrical shielding, and particularly to a combined environmental seal and radio frequency interference shield for electrical apparatus.

Certain types of electrical apparatus are adversely affected by environmental conditions as well as by radio frequency interference. Such apparatus often includes actuatable elements such as switch buttons, solenoids, circuit breakers as well as others; and in some instances, it is necessary to oberve the actuatable element to determine its condition.

The principal object of the present invention is to provide a combined environmental seal and radio frequency interference shield for the above-referred-to type of apparatus.

Another object of the invention is to provide such a combined seal and shield that includes a window through which the action or condition of the actuatable element can be observed.

Still another object of the invention is to provide such a combined seal and shield in which its attenuation is increased.

In one aspect of the invention, a panel may have certain electrical equipment mounted on its rear face, with actuatable means extending through an aperture in the panel to its front face. A combined environmental seal and radio frequency shield may be attached to the front face of the panel for covering an aperture therein and for accommodating the actuatable means extending through the aperture, while still preventing environmental changes or radio frequency interference from adversely affecting the electrical apparatus to which the actuatable means is connected.

In another aspect of the invention, the combined seal and shield may comprise a molded frame-like member of resilient, electrically conducting rubber having flange means adapted to be intimately united to the panel and to surround the aperture through which the actuatable means extends.

In still another aspect of the invention, the opening in the frame, forming a window therein, may be covered with an electrically conducting screen. The edges of the screen may be embedded and bonded within the edges of the frame to provide an effective seal therewith.

In still another aspect of the invention, transparent plastic or rubber material may be permanently bonded to both sides of the screen and to the conductive rubber frame.

The above, other objects and novel features of the invention will become apparent from the following specification and accompanying drawing which are merely exemplary.

Figure 1:
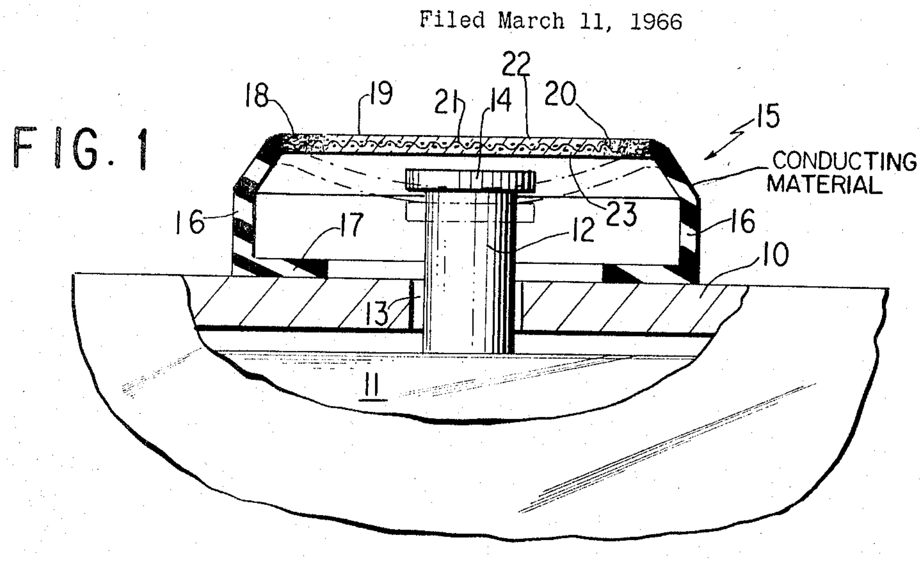
FIG. 1 is a partial sectional view of a panel to which the principles of the invention have been applied.
Figure 2:
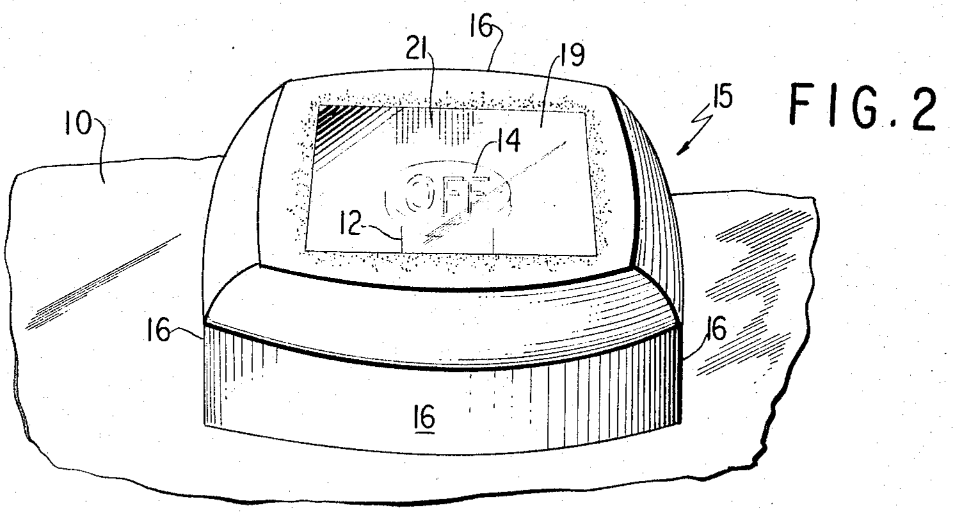
FIG. 2 is a perspective view of the apparatus shown in FIG. 1.

Referring to FIG. 1, the principles of the invention are shown as applied to an electrically conductive panel 10, on the back of which a piece of electrical apparatus 11 is mounted. In the embodiment disclosed, the apparatus 11 is an electrical switch having a push button 12 extending through an aperture 13 in panel 10. The button 12 may include a head 14 therein having indicia thereon required to be observed in operating the switch or appartus 11. A molded frame-like member 15 may include side walls 16 at both ends, terminating in inturned flange means 17 and 18. The flange means 17 is adapted to be intimately connected to the outer surface of panel 10 surrounding the aperture 13. The flange means 18 may define an aperture 19 through which the condition of push button 12 can be observed.

The frame-like member 15 is preferably made of resilient electrically conductive rubber, plastic or the like; and the flange means 17 may be attached to panel 10 by bonding with a suitable electrically conductive adhesive, or by other suitable means.

The flange means 18 may be cut at 20 to receive the edges of an electrically conductive screen 21 that may be made of copper, aluminum, stainless steel, Monel, brass, silver or any electrically conductive material. The edges of screen 21 may be bonded by a suitable adhesive to provide a good conductive bond between the edges of screen 21 and the edges of frame member 15. The wire screen extends over the entire window formed by the aperture 19 and, as explained above, its edges are sandwiched between layers of the flange means 18.

The screen may be covered on both sides with a resilient, transparent plastic layer 22, 23 which is intimately bonded to the screen 21 and to the edges of the flange means 18.

In operation, a conductive path is provided from panel 10 through the flexible conducting shield 15 including the flange means 17, walls 16, flange means 18, thence through the conducting screen 21. This provides an effective shield, preventing radio frequencies from entering the aperture 13 which might adversely affect the apparatus 11. The flexible flange means 17 effects a seal at the panel 10, and since the flange means 18 is bonded to the transparent plastic layers 22, 23, an environmental shield for the apparatus 11 and button 12 is provided.

Pushing on the plastic covered screen 21 deflects member 15 so that switch button 12 can be actuated.

Figure 3:
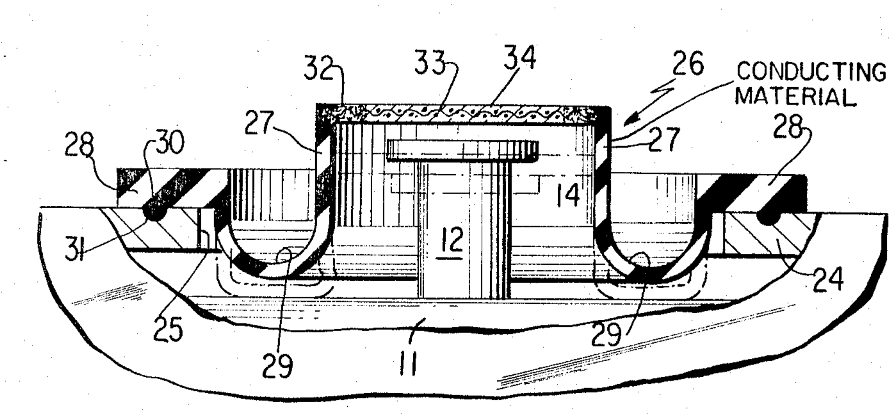
FIG. 3 is a partial sectional view of a modified form of the invention.

Referring to FIG. 3, an electrically conductive panel 24 has a relatively large aperture 25 therethrough. A molded frame-like member 26 may include walls 27 having flange means 28 connected to their lower ends by a trough-like portion 29. A bead 30, integral with the undersurface of flange means 28, may fit within a groove 31 in the top face of panel 28, said groove 31 surrounding the aperture 25. The member 26 may be made from material similar to that used for member 15 and preferably is flexible so that an intimate bond by a suitable adhesive can be made between flange means 28 and panel 24.

The upper end of wall 27 includes flange means 32 that supports a wire screen 33 in the same manner that flange means 18 supports screen 21. In FIG. 3, a rigid, transparent window 34 is sealed to the screen 33 and to the edges of flange means 32 so as to provide an environmental seal.

Depressing the rigid window 34 causes the trough-like means 29 to deflect so that button 12 can be depressed to actuate the mechanism 11.

Although the various features of the improved combined seal and RFI shield have been shown and described in detail to fully disclose two embodiments of the invention, it will be evident that changes may be made in such details and certain features may be used without others without departing from the principles of the invention.

What is claimed is:

1. Apparatus comprising in combination, a panel; an electrical component mounted on said panel and including an actuatable element extending therefrom; a combined environmental seal and radio frequency interference shield covering said element, said seal and shield comprising a frame-like member molded from electrically conductive resilient material and including flange means sealed to said panel surrounding said element; electrically conductive screen means bonded to said frame-like member and providing a window through which the actuatable element of said electrical component can be observed; and transparent means covering said screen means and bonded to said frame-like member.

2. An apparatus according to claim 1 wherein the panel has an aperture therethrough with the actuatable element extending through said aperture, the shield covers said aperture, and the flange means surrounds said element.

3. An apparatus according to claim 1 wherein said flange means has an upstanding wall means connected thereto, with other flange means integral with the upper end of said wall means forming a window through which said actuatable element can be observed.

4. An apparatus according to claim 1 wherein there are flexible transparent plastic coatings on each side of said screen means making a hermetical seal with said frame-like member.

5. An apparatus according to claim 3 wherein there are flexible transparent plastic coatings on each side of said screen means making a hermetical seal with said frame-like member.

6. An apparatus according to claim 2 wherein said flange means is connected to said frame-like member by flexible trough means, and there are bead means on said flange means adapted to fit into groove means surrounding the aperture in said panel.

7. An apparatus according to claim 6 wherein there are rigid transparent means covering said screen means and sealed to said frame-like means.

No reference cited.

ROBERT K. SCHAEFER, *Primary Examiner.*

H. O. JONES, *Assistant Examiner.*